(12) United States Patent
Kilic et al.

(10) Patent No.: US 7,775,672 B2
(45) Date of Patent: Aug. 17, 2010

(54) COMBINED ROOF AND FRONT MIRROR

(75) Inventors: Orhan Kilic, Ansbach (DE); Albrecht Popp, Weihenzell (DE); Werner Lang, Ergersheim (DE)

(73) Assignee: Lang Makra North America, LLC, Ridgeway, SC (US)

( * ) Notice: Subject to any disclaimer, the term of this patent is extended or adjusted under 35 U.S.C. 154(b) by 0 days.

(21) Appl. No.: 12/077,219

(22) Filed: Mar. 18, 2008

(65) Prior Publication Data
US 2008/0239529 A1 Oct. 2, 2008

(30) Foreign Application Priority Data
Mar. 19, 2007 (DE) .................. 10 2007 013 028

(51) Int. Cl.
*G02B 5/10* (2006.01)
*G02B 7/182* (2006.01)
*B60R 1/06* (2006.01)
*B60R 1/08* (2006.01)

(52) U.S. Cl. .................. 359/865; 359/866; 359/868

(58) Field of Classification Search .................. 359/850, 359/866, 868, 855, 864, 865
See application file for complete search history.

(56) References Cited

U.S. PATENT DOCUMENTS

| 2,251,325 | A | * | 8/1941 | Clark | 359/866 |
| 2,408,495 | A | * | 10/1946 | Wager | 356/439 |
| 3,764,201 | A | * | 10/1973 | Haile | 359/864 |
| 4,349,247 | A | * | 9/1982 | Koyama et al. | 359/863 |
| 4,730,914 | A | * | 3/1988 | Stout | 359/868 |
| 5,005,963 | A | * | 4/1991 | Schmidt et al. | 359/868 |
| 5,084,785 | A | | 1/1992 | Albers et al. | |
| 5,307,211 | A | * | 4/1994 | Schmidt et al. | 359/868 |
| 5,424,875 | A | * | 6/1995 | Davis, II | 359/850 |
| 5,563,744 | A | * | 10/1996 | Matsumiya | 359/855 |
| 5,666,227 | A | * | 9/1997 | Ben-Ghiath | 359/630 |
| 5,963,127 | A | * | 10/1999 | Lang et al. | 340/436 |
| 5,980,050 | A | * | 11/1999 | McCord | 359/868 |
| 6,390,631 | B1 | * | 5/2002 | Lang et al. | 359/843 |
| 6,554,436 | B1 | * | 4/2003 | Lang et al. | 359/841 |
| 2005/0161573 | A1 | | 7/2005 | Schmidt et al. | |
| 2007/0008637 | A1 | | 1/2007 | Schmidt et al. | |
| 2008/0100938 | A1 | | 5/2008 | Englander et al. | |

FOREIGN PATENT DOCUMENTS

| DE | 296 17 073 U1 | | 1/1997 |
| DE | 19751228 | * | 5/1999 |
| DE | 198 39 833 A1 | | 3/2000 |
| GB | 2335898 | * | 10/1999 |
| JP | 55 083631 A | | 6/1980 |
| JP | 02-144240 | * | 6/1990 |
| JP | 08-268167 | * | 10/1996 |
| JP | 10-194044 | * | 7/1998 |
| WO | WO 2007/040625 A1 | | 4/2007 |

* cited by examiner

*Primary Examiner*—Ricky D Shafer
(74) *Attorney, Agent, or Firm*—McNair Law Firm, P.A.; Seann P. Lahev (57) ABSTRACT

The invention concerns an external mirror arrangement comprising a front mirror of the Group of the Directive 2005/27/EG for the visual transmission of a first field of view and for the visual transmission of a second field of view contains a safety mirror. In accord with the invention, the front mirror and the safety mirror are integrated in one mirror head.

7 Claims, 7 Drawing Sheets

COMBINED ROOF AND FRONT MIRROR

The invention directed to an arrangement for an external mirror for motor vehicles, comprising one front mirror of Group VI with a safety mirror of Group V, in accordance with the Directive 2003/97/EG of the European Parliament as well as the Notification made active on Nov. 10, 2003.

The authority of the Directive 2003/97/EG covers the minimum number and types of the specified mirrors (internal and external mirrors) for those motor vehicle classes as defined in the advisory of Feb. 6, 1970 and found in the Directive 70/156/EWG, as well as the installation sites thereof as indicated by the motor vehicle class. For motor vehicles of the classes N2>7.5-t and N₃ there has been defined, in accordance with the above Directive 2003/97/EG, as outside, Group V mirrors, such mirrors as, respectively, an inclined mirror of known proximal range, side area safety mirror and a front mirror of Group VI. For motor vehicles of other classes, such mirrors are also admissible. The safety and front mirrors are, for instance, to be so installed, that the driver can easily and clearly view an otherwise hidden roadway from his location in normal seating, with the fields of view lying, first, on that side remote from the driver and second immediately forward from the motor vehicle. Furthermore, such mirrors are to be so placed, that no point thereon or within their supported positions lie less than two meters above road surface. This height regulation being in force when the motor vehicle is loaded at its technically allowed, maximum carrying capacity.

Up to this time, it has been customary to install the safety mirror and the front mirror with independent suspensions, which caused them to be separated from one another at individual locations on the motor vehicle cab. DE 198 39 833 A1, for example discloses a safety mirror, which is designated as an inclined mirror with a mirror head, a housing and a mirror pane. This safety mirror is to be installed at an elevation above the passenger side door on its own supporting structure and attached to the motor vehicle cab. The front mirror, similarly having a mirror head, a housing and a mirror pane, is, as a rule, placed on an individual support on the cab and above the windshield. This separated installation of a safety and a front mirror has the possible advantage, that these mirrors can be so placed in relation to one another, that the driver has a satisfactory view of respective fields of view, which include the passenger side of the vehicle, that is to say, the fields of view are visible while he looks forward from his seat. Compared with an arrangement, wherein the front mirror and the safety mirror are attached to one support structure for a main rearview mirror (large size) of the Group II, thus conforming to the above stated Directive 2003/97/EG, the divided arrangement reduces structural loading on a single support structure.

Contrary to the above stated advantage, the divided installation of the safety mirror and the front mirror requires individual supporting structures of different types and sizes. As a whole, the separated installation proves itself to be disadvantageous in regard to weight and manufacturing costs of the safety and front mirrors. Additionally, installation of two mirror arrangements increases the mounting cost involved in placing the safety mirror and the front mirrors on the motor vehicle. Additionally, the driver is obliged to direct his vision onto two different mirrors, which are spatially set apart.

Giving consideration to the above history of the subject to this time, the purpose of the invention is to make available an external, mirror arrangement for a safety mirror and a front mirror, both located in the front of the vehicle, in accord with the above stated Directive 2003/97/EG, wherein weight and costs of manufacture of mirror arrangement are reduced and the mounting thereof simplified, and the driver is afforded satisfactory viewing field for the blind side area and for that area encompassed by the front mirror.

SUMMARY OF THE INVENTION

The above objectives are accomplished according to the present invention by an external mirror arrangement in compliance with the Directive 2003/97/EG.

The invented external, mirror arrangement possesses a common mirror head, within which is located a front mirror for image transmission of a first field of view, which lies in a visually obstructed area in front of a motor vehicle and also, within which mirror arrangement, an installed safety mirror which serves for the visual transmission of a second field of view commanding the passenger side of the motor vehicle. In order to install the common mirror head of the invented external mirror arrangement in an appropriate position on the cab of the motor vehicle, an thereto adapted support structure has been developed. Considering the manufacture of two independent mirror arrangements, encompassing first a safety mirror and second a front mirror, which include for each a mirror head, a housing and a mirror pane, as well as a support structure and comparing this to one forward mounted mirror arrangement with a single, supported mirror head, which has its own integral housing carrying combined mirror panes, one can obviously observe, that by means of the combinational invention of the mirror arrangement for the safety and front mirrors, wherein both are placed in a common housing, that weight and manufacturing costs have been substantially reduced. Since, by means of the combination of the safety and front mirrors, no more than one mirror head needs to be mounted on the motor vehicle. Thereby the mounting operation is considerably simplified. Advantageously, the invented mirror arrangement offers an additional improvement, in that by looking at only one mirror arrangement, the driver can see at once two fields of view, that is to say, these views being transmitted by mirror surfaces dedicated to safety as well as the front mirror purposes. This mode of observing is made by means of a single mirror arrangement mounted in front of the driver who no longer needs to divide his attention between two mirrors, which are separated from one another in different locations.

In accord with the invention, there is no official hindrance to allowing the safety mirror to be placed in a single front mirror assembly, wherein one double mirror surface pane, or even two separated mirror panes, can commonly carry out their mutual functions.

In a first variant, the mirror head encompasses a convex mirror pane having thereon one first mirror surface area which visually transmits a first field of view and one second mirror surface area which visually transmits a second field of view. The border denoting separation of the first and of the second fields of view can be graphically delineated for the driver in by identifiable lines or by a change in the color tint between the two mirror surfaces. It is also possible that the division can be identified by appropriate markings incised on the mirror pane.

The convex mirror pane is spherical in curvature. In order to fulfill the demands of the Directive 2003/97/EG, the allowable radius of curvature of that area which reflects the safety field of view cannot be less than 300 mm, while alternately, the radius of curvature of the front mirror cannot be less then 200 mm. In the first variant, wherein the fields of view are designed for the proximal safety area as well as for the front field, the possibility exists, that both mirrors can be designed with the same radius of curvature, whereby, the radius of curvature would then lie in a range between 200 and 340 mm. In order to desirably hold the construction size of the mirror head to the smallest possible dimensions, the radius of curvature may be about 240 mm. Additionally, to simplify manufacture, the radius of curvature may lie in a range between 300 and 340 mm, preferably at approximately 315 mm.

In order to facilitate the positioning of the safety mirror or the front mirror to accommodate a personal viewing angle, which is convenient for the driver in his driving position, the mirror pane in the mirror head housing is advantageously redirected by an adjustable support. Such an adjustment of a mirror pane, relative to the mirror head housing allows small angular corrections, without the necessity of involving the entire external mirror assembly or the mirror head therein in a change relative to the support structure. The adjustment of a mirror pane relative to the mirror head housing is carried out by a mechanical operation or by an adjustment device activated by an electric motor located between the mirror head housing and the mirror pane. WO 02/072386 A1 discloses such a device as a motorized pivotal apparatus. Additionally, it is possible that the mirror head can be installed with a holding means designed to be adjustable relative either to the motor vehicle or to the support structure.

In a second variant, the mirror head possesses a mirror pane which covers the first field of view and has also a mirror pane separate there from which oversees the second field of view.

These mirror panes are, advantageously, of a spherical, convex curvature. In order to fulfill the Directive 2003/97/EG, the radius of curvature of the contained safety mirror cannot be less than 300 mm, and the corresponding pane for the front mirror is specified to be not less than 200 mm. In this described second variant, wherein the field of view for the safety mirror as well as the field of view for the front mirror are to be served by two separate mirror panes, it is possible that both mirror panes may be made with the same radius of curvature, which would be an aid in the reducing of the costs of manufacture. Advantageously, it is also possible, that the mirror pane for the front mirror can be made with a smaller radius of curvature R, which, in this case, would be about 240 mm, while the radius of curvature R for the safety mirror pane would still be approximately 315 mm.

To accommodate the installation of the safety mirror and/or the front mirror, to the personal angle of sight of a driver sitting in his appointed seat, the mirror panes of the safety mirror and the front mirror are respectively provided with independent positioning adjustments. The independent adjustability of the two mirror panes relative to the mirror head housing allow small angular changes, without the necessity of involving the entire external mirror arrangement of the mirror head in relation to the support structure. The angular adjustment of the two mirror panes relative to the mirror head housing is done, advantageously, by means of positioning devices placed between the mirror head housing and each of the mirror panes. This positioning device may be mechanically operated or may be activated by an electric motor, as is taught by WO 02/072386 A1, which describes a motorized pivotal device. Additionally, the mirror head can be mounted in an adjustable manner, this being done relative to the vehicle, or the mirror head can be angularly moved in opposition to the holding structure The invented external, mirror arrangement preferably finds its application in commercial vehicles of the Class $N_2>7.5$ t and $N_3$ of the Directive 2003/97/EG. In the case of the cited motor vehicles the invented external, rearview mirror arrangement is best affixed by a mirror head holding means, which projects externally from the roof at that upper, front corner location on the passenger side of the cab. This holding means would further project laterally toward the front and be extended downward in an inclined manner and offset at a predetermined separating distance from the cab on which it is installed.

In addition, the invented external mirror is so advantageously mounted on the cab, that the mirror head, when seen from a point in front of the motor vehicle, is positioned by the internal location of the front mirror, thus projecting itself at least partially sideways across the front windshield and so lying in front of the windshield. In the case of such an installation of the external mirror arrangement, it is possible that a blind spot for the driver, visually obstructed by the vehicle body and located across the front end and along the passenger side of the vehicle, can be reduced in its scope. In accord with the invention, the mirror head can be placed in an advantageous positioning, whereby the single mirror pane, if so required, then both mirror panes when seen in plan view, arrange themselves in a somewhat V-shaped outline. This formation enables the installation of an external mirror arrangement in the above described corner location of the cab, in such a way, that the V-shaped outline of the mirror head follows the contour of the corner formed by the cab front and the passenger side of the vehicle.

As an alternate to the above, the mirror head, in a plan view looking onto the single mirror pane, if so required, then onto both mirror panes can encompass a somewhat trapezoidal outline.

In a plan view of the mirror pane, or of the mirror panes, the mirror head is advantageously apportioned into a symmetrical left and right side.

DESCRIPTION OF THE DRAWINGS

The construction designed to carry out the invention will hereinafter be described.

DESCRIPTION OF A PREFERRED EMBODIMENT

Referring now in more detail to the drawings, the invention will now be described in more detail.

Figure 1:
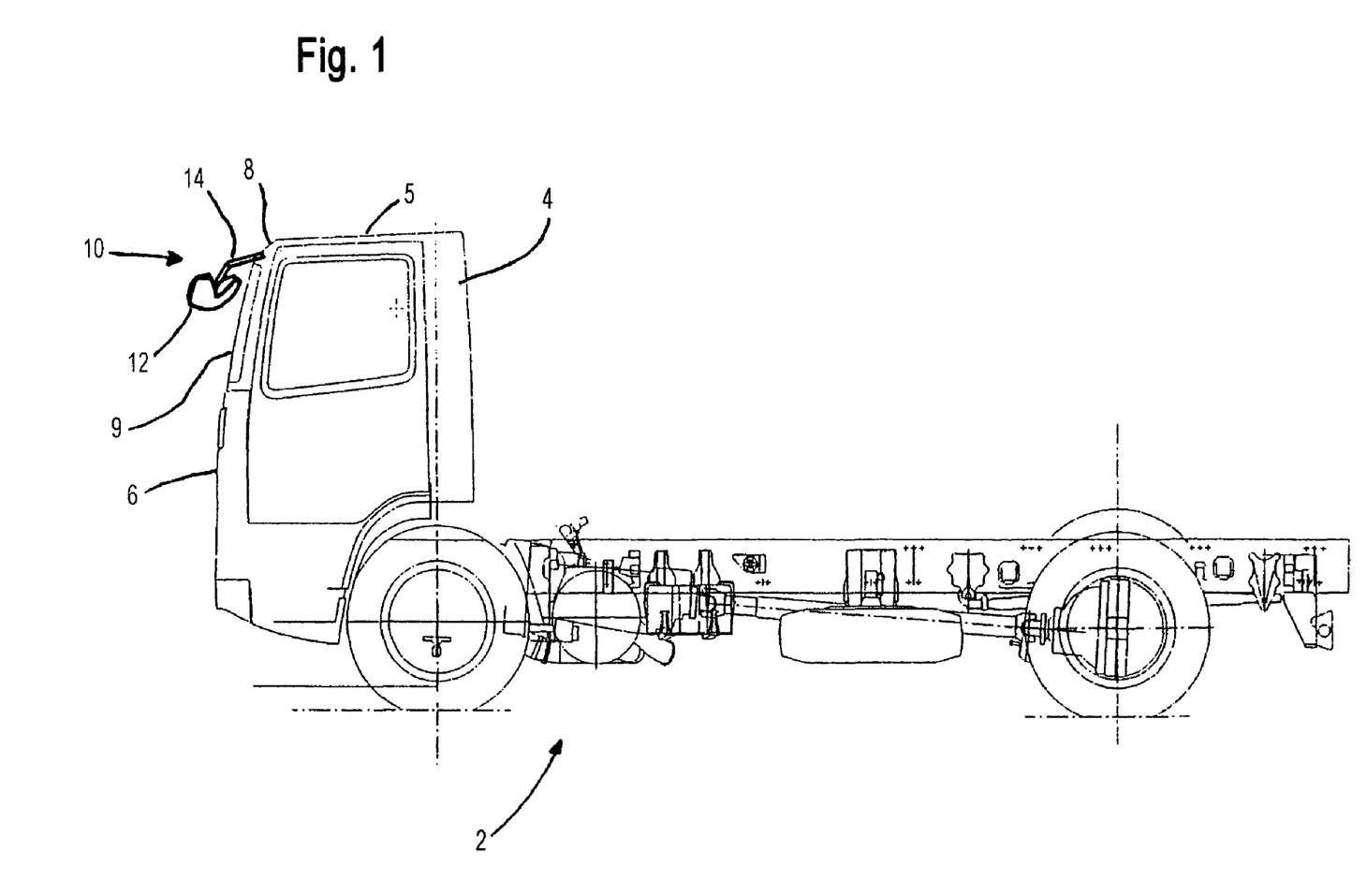
FIG. 1 is a schematic side view of a commercial motor vehicle with an external mirror arrangement in accord with the invention.
Figure 2:
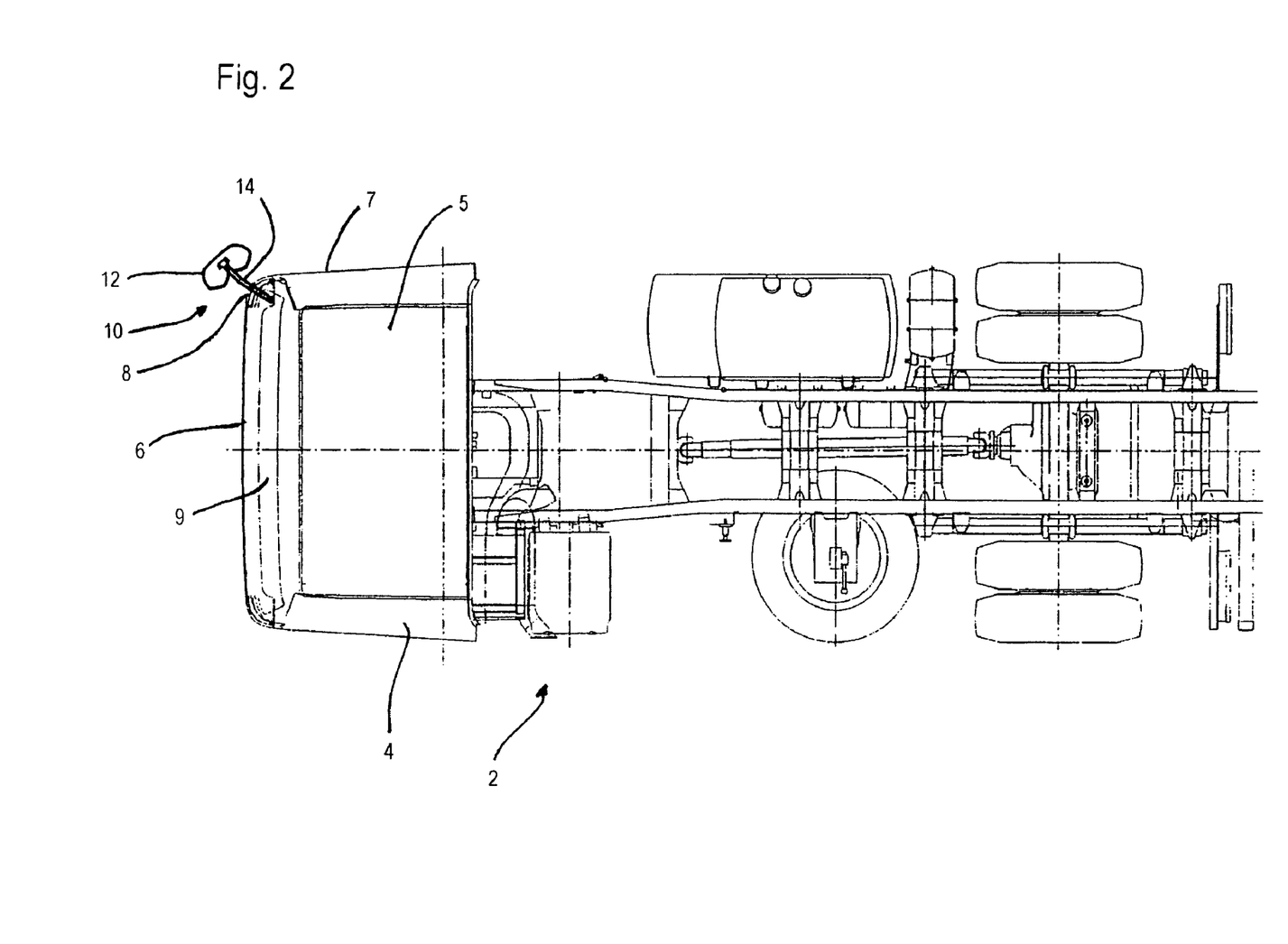
FIG. 2 is a schematic top view of a commercial motor vehicle with an external mirror arrangement in accord with the invention.

FIGS. 1, 2 show a commercial vehicle 2 of the Class $N_2>7.5$ t and $N_3$ of the Directive 2003/97/EG, within which Class and Directive specifications the external mirror arrangement of the invention application. As may be seen in FIGS. 1, 2, the mirror head 12 of the external mirror assembly 10 is fastened by means of a support structure 14 onto the cab 4 of the commercial motor vehicle 2. The support structure 14 is in form of a shaft of an angularly shaped arm when it is fastened on the roof 5 at the front end 6 on the passenger side 7 of the cab 4 in an upper corner area 8, from which it protrudes at a predetermined offset from the cab 4. The support arm 14, when made in the form of linked arms, is conventionally made of plastic or steel and is secured to the cab 4 at its free end by: a threaded connection, an adhesive attachment, or clamping means, or the like. This support arm 14 can also be integrally incorporated into the cab 4 structure upon manufacture. On the other end of the support arm 14, which is distal from the cab connection, the mirror head 12 is rigidly attached. The fastening of the mirror head 12 can be carried out by screw engagement, adhesive means, clamping or integrally factory made. Alternatively, the mirror head 12, in a known manner, can be bound in a releasable way by means of an installation of itself relative to the motor vehicle 2. To attain an adjustable securement of a desired position, the mirror head 12 can be affixed by a (not shown) pivotal linkage to the support structure arm 14. In order to enhance illustrative clarity, this external mirror as defined by the Directive 2003/97/EG is not shown.

As may be seen in FIGS. 2-5, the mirror head 12 is so installed on the cab 4 of the commercial motor vehicle 2, that, when seen from a point in front of vehicle in the area of the front mirror (18a), it extends itself somewhat to the side of the windshield 9. At the same time, the mirror head 12 lies visibly in front of the windshield 9.

Figure 3:
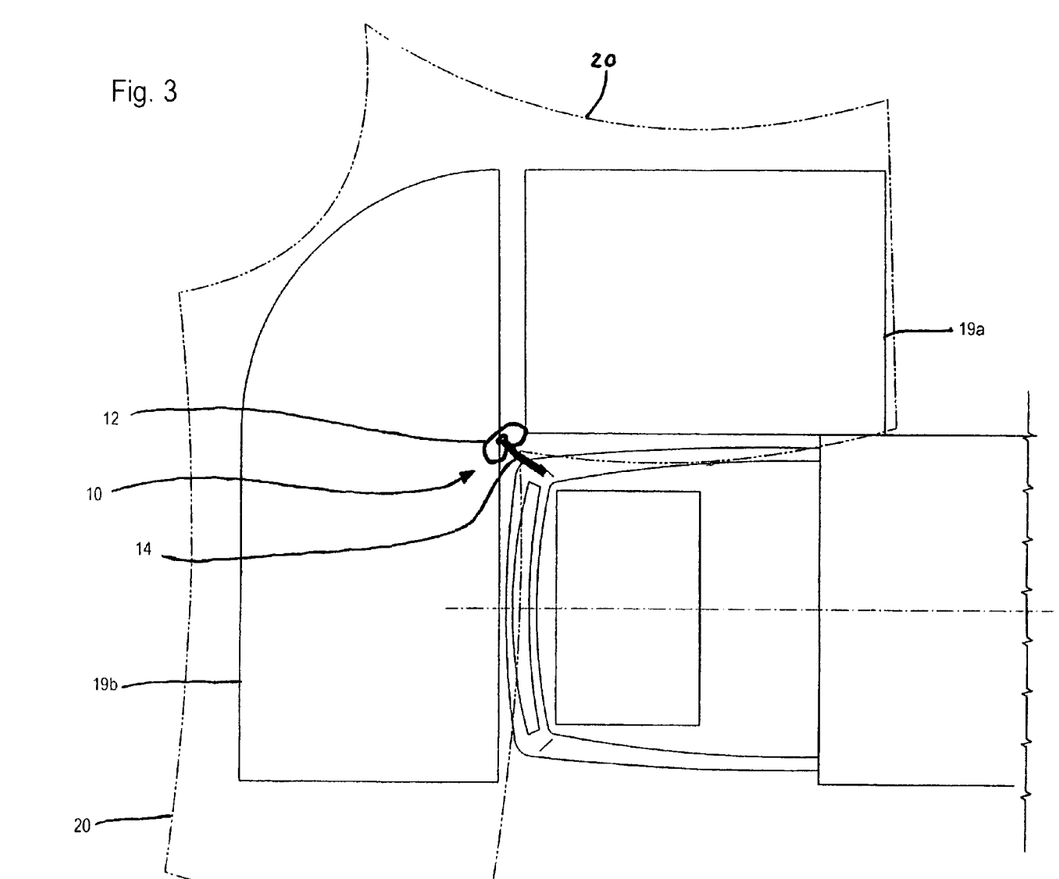
FIG. 3 is a schematic top view of a commercial motor vehicle such as shown in FIG. 1, illustrating the transmitted fields of view required of the safety and front mirrors in accord with Directive 2003/97/EG, and also the fields of view as commanded by the mirror arrangement of the invention.

FIG. 3 presents the fields of view 19b, 19a, which are required to be accorded to the driver by the Directive 2003/97/EG. These fields of view are shown in comparison to the actual fields of view 20 furnished by the safety mirror and the front mirror of the invented external mirror arrangement 10. As FIG. 3 further shows, the actual field of view 20 created by the invented mirror arrangement 10 overlaps the required field of view 19b, 19a.

The mirror head 12 of the external mirror arrangement 10 combines a safety mirror 18b and a front mirror 18a, made in accord with the Directive 2003/97/EG. This combination is housed in a common mirror housing 16, which is installed by means of a holding structure 14 is rigidly attached to the cab 4 of the motor vehicle 2.

Figure 4:
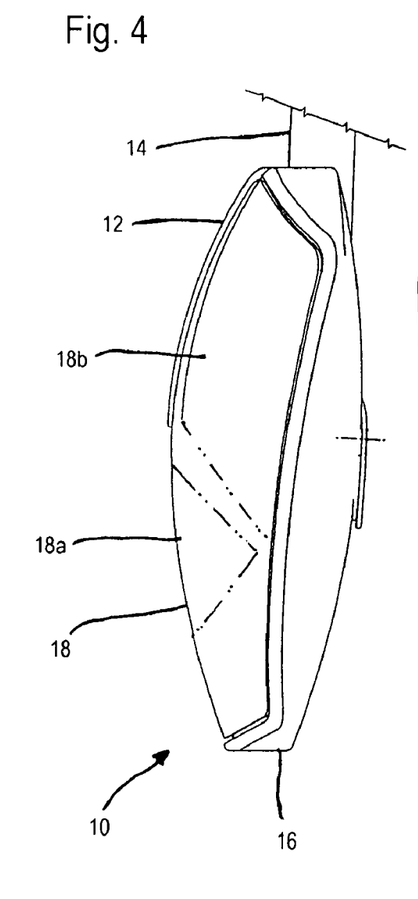
FIG. 4 is a schematic profile view of an external mirror arrangement in accord with a first embodiment.
Figure 5:
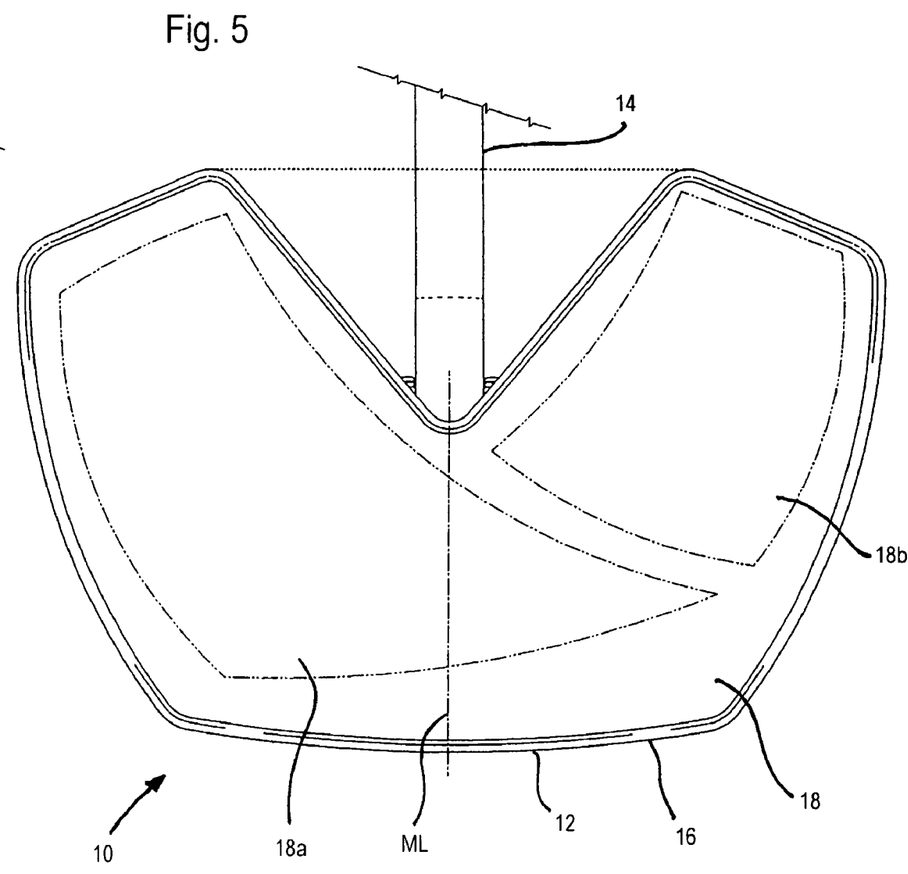
FIG. 5 is a schematic plan view of an external mirror arrangement in accord with the first embodiment.

FIGS. 4, 5 show a first embodiment of the mirror head 12 of the external mirror arrangement which includes a mirror pane 18 retained by a mirror head housing 16. In this first embodiment, the mirror pane 18 is rigidly affixed, that is, positionally unchangeable, within the mirror head housing 16.

The mirror head housing 16, which is made of plastic, in a known manner, is constructed in a shell shape.

Figure 6:
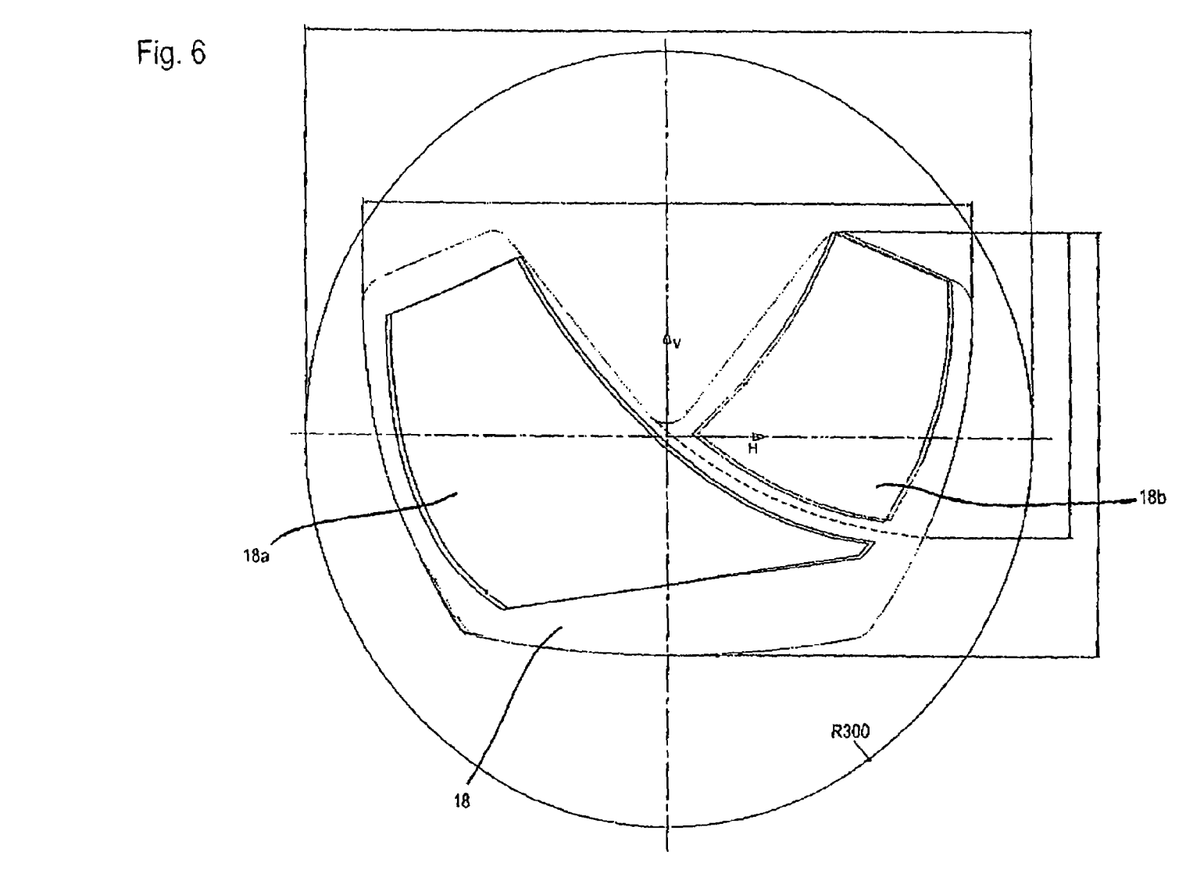
FIG. 6 is a diagrammatic view illustrating the overall dimensioning and the geometric shape of the invented external mirror arrangement in accord with the first embodiment.

The mirror pane 18 possesses, as can be seen in FIG. 5, the first mirror surface area 18a, which captures a first field of view, the curvature of which area carries out the function of the front mirror. A second surface area 18b of the mirror pane 18 visually captures a second field of view and serves as the safety mirror (also 18b) for the passenger side. In FIGS. 4, 6 the limits of the first and the second mirror surface areas, 18a, 18b, are depicted in dotted lines. FIG. 5 shows additionally, that the mirror head 12 and the mirror pane 18 are symmetrically designed relative to an imaginary center line (here shown as ML) and consequently falls into a V-shape outline. However, the two mirror surface areas 18a, 18b, that is, the front mirror and the safety mirror, do not follow the symmetrical outline of the mirror head 12 or the conforming mirror pane 18. The first mirror surface area 18a, which visually transmits the first field of view, extends itself in FIG. 5 from the left half of the mirror pane 18, over the center line ML and proceeds into right half of the mirror pane 18. The second mirror surface 18b, which overlooks the second field of view, remains completely contained in the right half of the mirror head 12, and to the right half of the mirror pane 18.

In FIG. 6 is presented the dimensioning and the geometric information concerning the mirror pane 18 of the external mirror arrangement 10, in accord with the first embodiment. The reference numbers V and H in FIG. 6 concern vertical and horizontal axes. The mirror pane 18 is bulged spherically outward and possesses a spherical surface or radius of curvature R of 300 mm. The mirror pane 18 lies on a convex surface of a sphere, which has been formed by a planar cut through a sphere section with a curvature radius R of 300 mm, while the sectional area possesses, when seen in plan view, an overall diameter of 419 mm. Millimeters are used as units in FIG. 6 in regard to the provided dimensioning of the mirror pane 18, within which the first and the second mirror surfaces 18a, 18b fill the available area. The radii and other dimensioning for the mirror pane 18 stated in FIG. 6 fulfill the requirements of the specifications of Directive 2003/97/EG for the visual transmission of a single safety mirror with its required proximal field of view and also meet requirements governing a single front mirror, while simultaneously actually commanding the front and side areas 19a, 19b, which exceeds the said specifications (see FIG. 3).

In a first variant of the first embodiment, which is designated in FIG. 5 by a dotted line, the mirror head 12 possesses in respect to symmetrical shaping, a somewhat trapezoidal outline instead of the above indicated V-shape.

Figure 7:
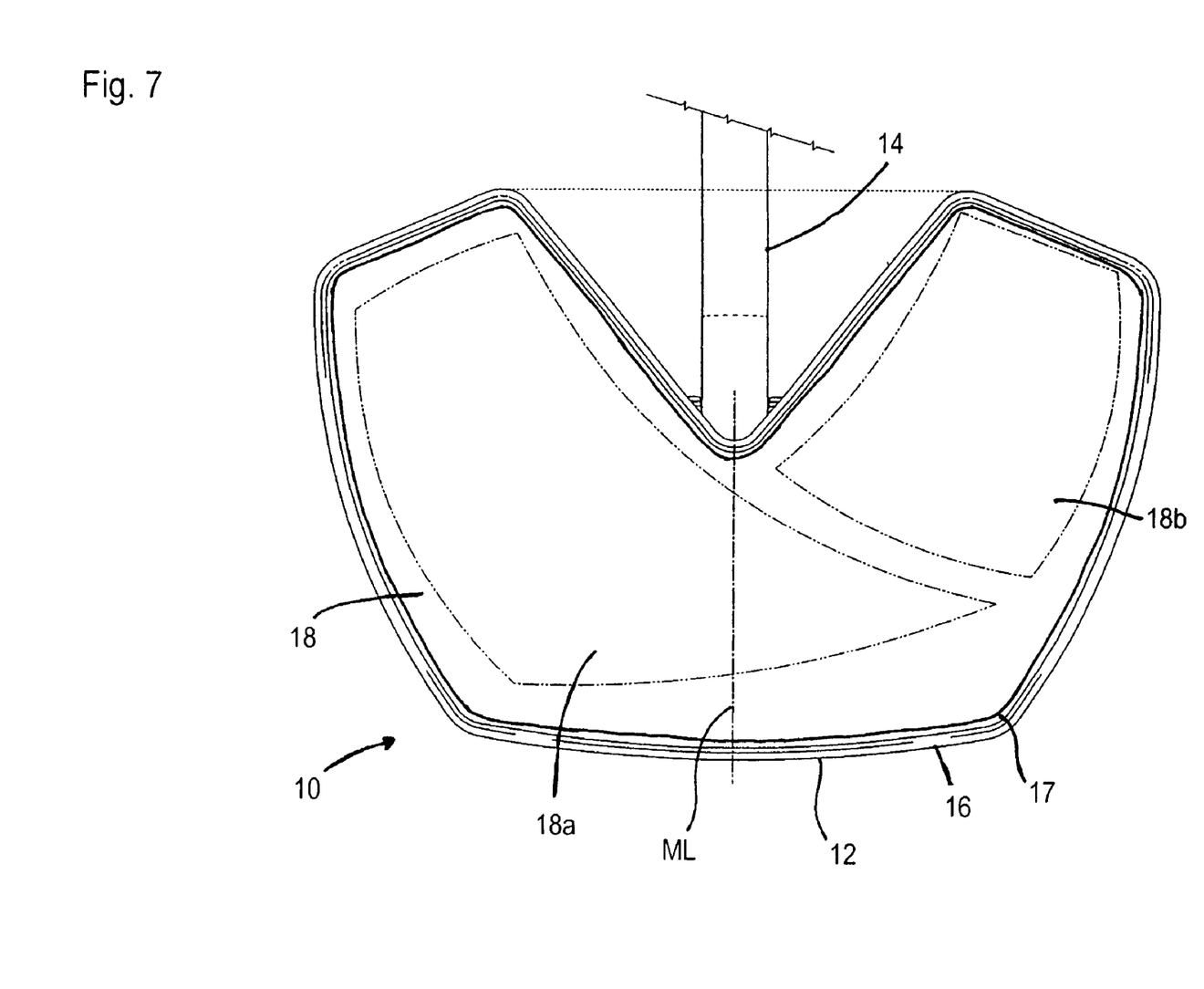
FIG. 7 is a schematic plan view of the external mirror arrangement in accord with the first embodiment.

In a second variant of the first embodiment, this being sketched in FIG. 7, the mirror pane 18 is made to be remotely positionable by means of an appropriate adjustment apparatus (not shown), which, for example, is of a type described in WO 02/072386 A1 as an electric motor activated, pivoting device. In FIG. 7 the reference number 17 illustrates the intervening space between the mirror pane 18 and the mirror head housing 16. As an alternative to the electric motor activated pivotal device, it is possible that the mirror pane 18 can also have a mechanically operated positioning means, namely a mechanical frictionally arrested device, which allows protected individual pivoting motions of the mirror pane 18, these motions being relative to the mirror head housing 16.

In a (not shown) third variant from the first embodiment, as an added feature, the mirror head housing 16, in an appropriate manner, can be fastened by a releasable clamping fixture, which allows adjustable positioning of the mirror head housing 16 on the support means 14 thereof.

Figure 8:
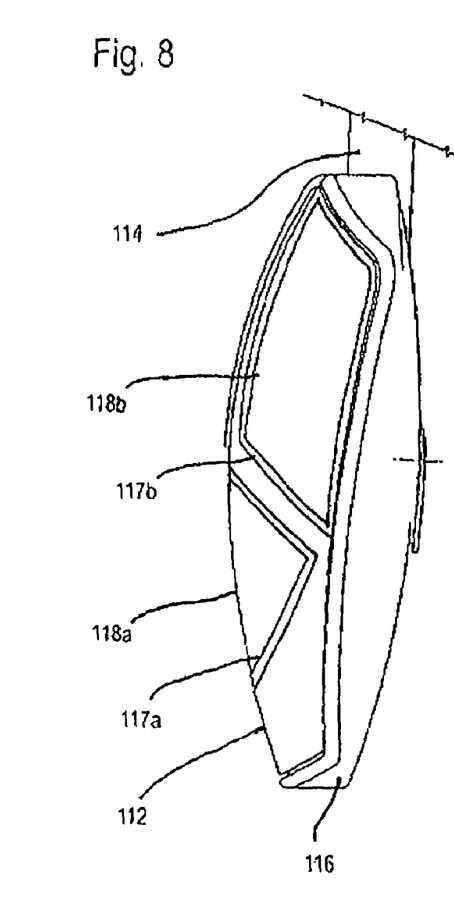
FIG. 8 is a schematic profile view of an external mirror arrangement in accord with the second embodiment.
Figure 9:
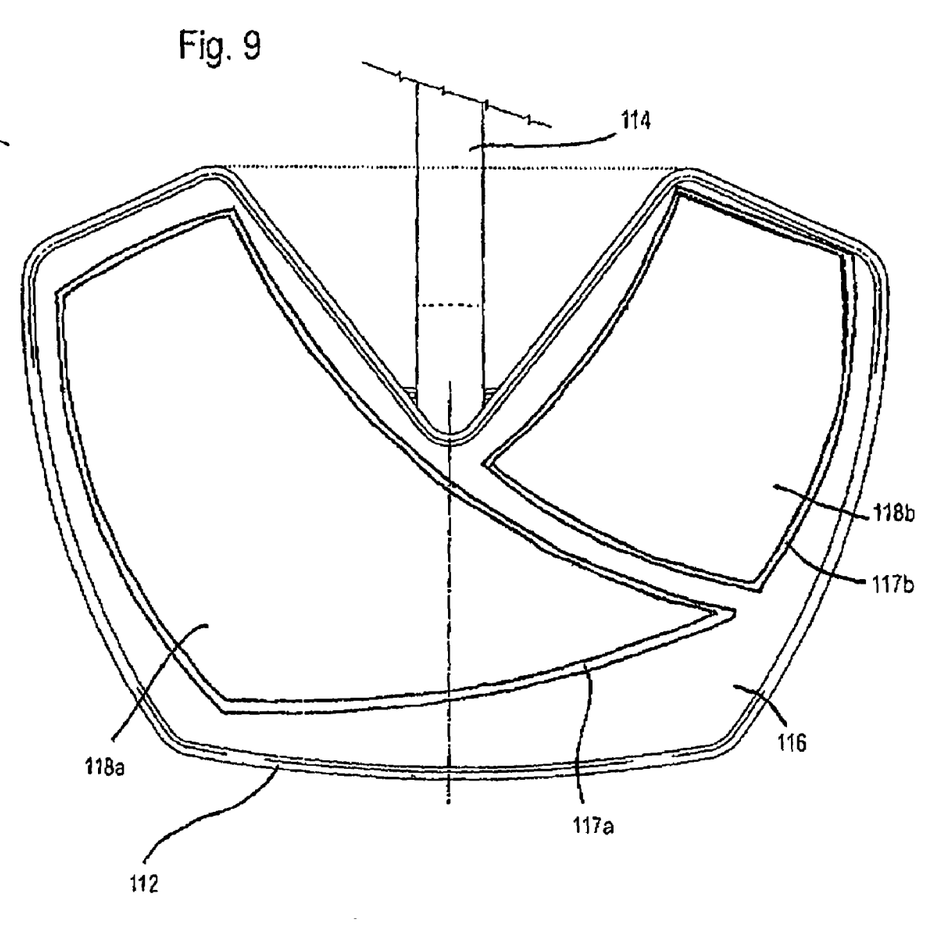
FIG. 9 is a schematic plan view of an external mirror arrangement in accord with the second embodiment.

The above mentioned second embodiment, as shown in FIGS. 8, 9 of the external mirror arrangement, differentiates itself from the first embodiment, in that its variances are essentially effected therein, in that the mirror head 112 possesses a first mirror pane 118a with a mirror surface area commanding the first field of view and a second mirror pane 118b with a mirror surface which commands the second field of view. The surfaces of the first and/or the second mirror, which visually transmit their respective fields of view, are separate, individual mirror panes 118a, 118b. Each of these, in like manner to the first embodiment, are designed with a spherical radius of curvature R of 300 and are spherically convex and secured in a common mirror head housing 116. The two mirror panes 118a, 118b are so integrated in the mirror head housing 116, that they lie in a neutral position upon one and the same spherical/convex surface. In FIGS. 8, 9 the two mirror panes 118a, 118b relative to one another, are arranged analogously to the second variant of the first embodiment and are pivotally adjustable in respect to the mirror head housing 116. The positioning and the adjustment capabilities of the two mirror panes 118a, 118b relative to the mirror head housing 116 can, in this case, be carried out by means of appropriate adjustment means, namely in the manner of WO 02/072386 with electrically motorized pivoting equipment. The reference numbers 117a, 117b in FIGS. 8, 9 indicate the intervening space between the two mirror panes 118a, 118b and the mirror head housing 116. Alternate to this, it is possible that the two mirror panes 118a, 118b can be pivotally positioned by means of an appropriate mechanically operated device of, for example, (not shown) a mechanical, friction arrested, pivoting apparatus, which allows specific swinging motions relative to the mirror head housing 116. Mirror head housing 116 is attached to the motor vehicle by holding structure 114.

In addition, it is possible that the two mirror panes 118a, 118b, as in the first embodiment, can be placed in a common mirror head housing, therein affixed as to be non-adjustable, that is, to be rigidly set therewithin.

While a preferred embodiment of the invention has been described using specific terms, such description is for illustrative purposes only, and it is to be understood that changes and variations may be made without departing from the spirit or scope of the following claims.

What is claimed is:

1. An external mirror arrangement having a secured position forwardly of and to the side of a cab of a motor vehicle for providing visual transmission comprising:
   a mirror head housing having a generally vertical centerline from which a first arm and a second arm are angled outward and supported in said secured position;
   a front mirror for providing visual transmission along a first field of view, having a non-symmetrical shape and carried by said mirror head housing so that said front mirror extends generally along said first arm of said mirror head housing and across said vertical center line of said mirror head housing;
   a safety mirror for providing visual transmission along a second field of view and carried by said second arm of said mirror head housing so that said safety mirror does not extend across said vertical center line;
   whereby,
   said external mirror arrangement provides a driver of the vehicle with a generally continuous view from longitudinally along one side of the vehicle to transversely across the entire front of the vehicle when the driver views said mirror head housing included in said external mirror arrangement.

2. An external mirror arrangement in accord with claim 1, wherein said safety mirror is horizontally and vertically spaced from said front mirror.

3. An external mirror arrangement in accord with claim 2 wherein one of said front mirror and said safety mirror is adjustably secured within said mirror head housing.

4. An external mirror arrangement in accord with claim 1, wherein said mirror head housing is angled generally downwardly when said external mirror arrangement is in said secured position so that the driver of the vehicle may simultaneously view longitudinally along one side of and transversely across the entire front of the vehicle by viewing said external mirror arrangement.

5. An external mirror arrangement in accord with claim 1, wherein said front mirror and said safety mirror comprise a convex mirror pane providing a first mirror surface providing visual transmission along said first field of view and a second spherically convex mirror surface for visual transmission along said second field of view, said first and second mirror surfaces having a radius of curvature in the range of 200 to 340 mm.

6. An external mirror arrangement in accord with claim 5, wherein the first mirror surface having a radius of curvature in the range of 200 to 340 mm, and the second mirror surface having a radius of curvature in the range of 200 to 340 mm.

7. A motor vehicle in accord with claim 1 wherein said external mirror arrangement is secured on a passenger side of the cab positioning the said mirror head housing so that said first arm is positioned generally in the front of the motor vehicle cab and the second arm is positioned generally to the side of the motor vehicle cab and said mirror head housing follows the contour of the corner area formed by the front side and the passenger side of the cab.

* * * * *